United States Patent

[11] 3,578,173

| [72] | Inventor | Robert John William Streeton<br>Harwell, England |
|---|---|---|
| [21] | Appl. No. | 777,784 |
| [22] | Filed | Nov. 21, 1968 |
| [45] | Patented | May 11, 1971 |
| [73] | Assignee | United Kingdom Atomic Energy Authority<br>London, England |
| [32] | Priority | Nov. 24, 1967 |
| [33] | | Great Britain |
| [31] | | 53565/67 |

[54] FOLDED SEMI-PERMEABLE MEMBRANE
4 Claims, 2 Drawing Figs.

[52] U.S. Cl. ................................................. 210/321,
161/122, 161/123, 161/149, 210/500
[51] Int. Cl. ..................................................... B32b 3/04,
B01d 39/16

[50] Field of Search............................................ 161/102,
123, 149; 210/321, 500; 206/63.3

[56] References Cited
UNITED STATES PATENTS

| 2,799,644 | 7/1957 | Kollsman | 210/321 |
| 2,949,181 | 8/1960 | Buccino | 206/63.3 |
| 2,982,416 | 5/1961 | Bell | 210/321 |
| 3,401,798 | 9/1968 | Nyrop | 210/321 |

*Primary Examiner*—John T. Goolkasian
*Assistant Examiner*—W. E. Hoag
*Attorney*—Larson, Taylor & Hinds ABSTRACT: A semipermeable membrane is made by casting on a ridged casting plate so that the rear surface of the membrane is grooved and it can be supported by a rigid impervious backing plate. Alternatively the membrane may be folded (at an angle to the grooves) so as to be self-supporting.

Patented May 11, 1971 3,578,173

FOLDED-SEMI-PERMEABLE MEMBRANE

BACKGROUND OF THE INVENTION

The present invention relates to the manufacture of membranes.

Membranes of the type in question (hereinafter called "semipermeable membranes") may be used for osmotic exchange, reverse osmosis, dialysis, electrodialysis and similar purposes. These membranes are normally thin and fragile and it has been the usual practice to provide a rigid porous support material to back up the membrane and also to provide a path for the liquid flow. It will be appreciated that the use of a support member increases the plant cost and volume and the latter may well be important in such plants as blood dialysis machines ("artificial kidneys").

It is an object of the present invention to provide a semipermeable membrane which does not require support by a rigid porous material.

SUMMARY OF THE INVENTION

According to the present invention a semipermeable membrane is made by casting upon a grooved or ridged casting plate, thereby to provide grooves or ridges on the rear surface of the membrane.

Such a membrane is adequately supported by a nonporous backing plate, the grooves in the membrane defining channels for the liquid flow to or from the rear surface of the membrane and the membrane being held on the packing plate by a positive differential liquid pressure applied to its front surface.

However, in a preferred arrangement the membrane is folded upon itself at an angle to the grooves and two edges of the folded membrane are sealed together. In this way a pocket is formed which requires no separate mechanical support whatever, the liquid flowing to or from the membrane by the unsealed edge of the pocket. In the simplest arrangement, the grooves re arranged to be at an angle of 45° with the fold line and are all straight parallel grooves. However, any other form of groove can be adopted which will provide a free passage for the liquid.

As an alternative to making individual pockets as previously described, a long strip of membrane can be formed and can be pleated so as to provide a large area of surface within a small volume.

If the membrane itself has unidirectional properties or if it is desirable to minimize the volume on one side of the membrane or if there is a very large pressure differential, these factors are taken into account in deciding which is to be the rear surface of the membrane or what liquid is to be on the rear side of the membrane.

Thus in the case of a blood dialysis machine, it is desirable to keep the blood volume at a minimum whilst the perfusion liquid into which the waste products are extracted from the blood may easily occupy a large volume. In this arrangement, the blood conveniently contacts the rear of the membrane.

It will be well-known that reverse osmosis is a technique which is used for desalination, that is to say for the removal of certain soluble salts from salt and brackish water to render it fit for drinking or agricultural purposes. The process involves applying the salt water to a semipermeable membrane under such a pressure as to force fresh water through the membrane in the reverse direction to that in which it would flow under normal osmotic pressure. It will be appreciated that the pressures involved are very high and may well be in the range 500—1500 p.s.i. In this arrangement, the salt water conveniently contacts the front surface of the membrane.

It should be explained that it is a normal technique to cast these reverse osmosis membranes and that after casting the membrane is treated in such a way as to provide a very thin active surface upon a relatively thick inactive substrate. In practicing the present invention the surface of the membrane remote from the casting plate (the front surface) is treated so as to be the active surface.

BRIEF DESCRIPTION OF THE DRAWINGS

In order that the present invention may more readily be understood, one embodiment of the same as applied to reverse osmosis will now be described by way of example, and by reference to the accompanying drawings, wherein.

DESCRIPTION OF THE PREFERRED EMBODIMENT

Figure 2:
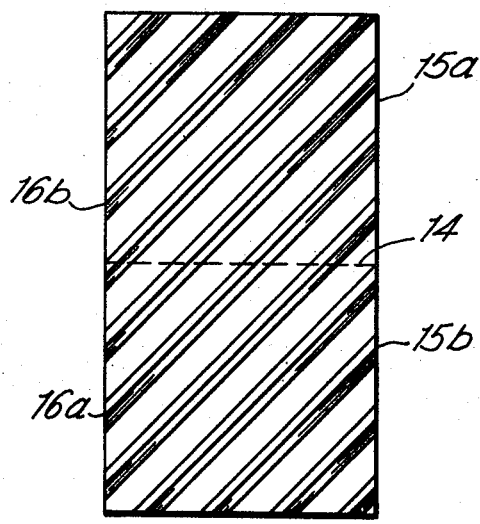
FIG. 2 is a plan view of the rear surface of the membrane after removal from the casting plate.

In this embodiment a casting plate 10 was prepared having grooves 11 which were straight and parallel and at an angle of 45° with the longer edges of the plate. The grooves 11 were 0.004 inches deep and had an interior angle of 60° being on a pitch of 0.012 inches. Using this casting plate, a membrane 12 was cast from a mix comprising 25 percent of cellulose acetate, 30 percent of formamide and 45 percent of acetone (all percentages were by weight). After casting at room temperature, the membrane was allowed to stand for half a minute to allow surface evaporation of the solvents and was then immersed in ice water and left for 16 hours. The membrane was then stripped from the casting plate and was cured for five minutes in water at 75°C.

Figure 1:
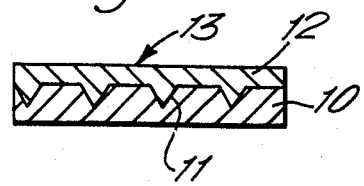
FIG. 1 is a diagrammatic sectional view taken at right angles to the grooves showing a membrane in position on a casting plate.

As is known, this treatment (which is a variant of the technique proposed by Loeb) produces a membrane suitable for reverse osmosis and having a thin active layer on its front surface, i.e. the surface marked 13 in FIG. 1.

The membrane was then folded about its transverse centerline 14 (FIG. 3) with the rear surface inwards so that the grooves on the contacting rear surface were at right angles to each other and the two longitudinal edges 15a, 15b and 16a, 16b sealed together to define a pocket. The edge of the pocket remote from the fold line was left open.

The membrane was tested for 2 hours at a pressure of 500 p.s.i. and proved to be an effective desalination membrane, the salt solution being applied to the front surface 13. No mechanical support was necessary and after the test the grooves, although deformed, still provided adequate passage for the fresh water which escaped from the open edge remote from the fold.

I claim:

1. A cast semipermeable membrane having a plurality of grooves upon one surface, folded upon itself along a line inclined to the line of grooves with the regions in between the grooves in contact, and sealed along at least one of the contacting edges.

2. A cast semipermeable membrane as claimed in claim 1, which is sealed along two of its contacting edges.

3. A cast semipermeable membrane having a plurality of ridges upon one surface, folded upon itself along a line inclined to the line of ridges with the opposed ridges in contact, and sealed along at least one of the contacting edges.

4. A cast semipermeable membrane as claimed in claim 3 which is sealed along two of its contacting edges.